April 23, 1946.  R. W. STUART ET AL  2,398,868
APPARATUS FOR ELECTRICAL WELL LOGGING
Filed June 26, 1943

Inventors:
Robert W. Stuart
Daniel Silverman
By: Gouart H. Kerslake
Attorney

Patented Apr. 23, 1946

2,398,868

UNITED STATES PATENT OFFICE 2,398,868

APPARATUS FOR ELECTRICAL WELL LOGGING

Robert W. Stuart and Daniel Silverman, Tulsa, Okla., assignors to Stanolind Oil and Gas Company, Tulsa, Okla., a corporation of Delaware Application June 26, 1943, Serial No. 492,364

3 Claims. (Cl. 175—182)

The present invention relates to the art of electrical well logging and more particularly to apparatus for making direct contact with the earth formations traversed by a cased or uncased well bore at some distance back from the face of the bore to determine various characteristics of said earth formations.

In the art of electrical well logging it is well known that electrical energy passing between electrodes disposed at various points within a well may be used to determine the nature of the earth strata in the vicinity of said electrodes by measuring various characteristics of the electrical energy. Any characteristic of the electrical flow may be used, such as the current, the resistance, the difference in potential, the impedance and the like. These characteristics enable one to determine the nature of the earth strata in the vicinity of the electrodes quite accurately and this information in turn gives an indication as to the presence or absence of water, oil, gas, or the like within said strata.

Often it is highly desirable to make a log of a well which has already been cased and cemented so that more accurate information for perforating or plugging may be obtained and thus improve production from the well. In many instances casing has been set in a bore hole without first making a log of the strata traversed. After this casing has been set it is usually very difficult, if not impossible, to obtain a reliable log of the strata with existing equipment. However, some information can be obtained with difficulty regarding the fluids in the formations back of the casing by perforating the casing at various points, permitting the entry of fluids into the casing and determining the nature of the fluids. One serious objection to this method lies in the fact that a considerable time interval must elapse between the perforating step and the measurement step because the perforator must be withdrawn before the testing equipment can be employed. This is highly undesirable. Another objectionable feature is that no knowledge of the formations can thus be gained.

According to the present invention it is proposed to drive at least one electrode through the well casing and a substantial distance into the strata adjacent said casing. A second or associated electrode may be located at the surface of the ground adjacent the well or at a distance therefrom or may be the well casing itself. Likewise the associated electrode may be disposed within the well casing or may also be driven through the casing and into an adjacent stratum.

Any suitable means may be employed for driving the electrode into the earth strata as for instance, by mechanically perforating the well casing and then driving said electrode through the perforated casing and into the stratum, but we have found that highly satisfactory results are obtained if the electrode is propelled explosively through the casing and into the strata in a manner similar to that used in gun casing perforators. Obviously electrical connection between the electrode and the surface of the earth must be maintained and this will be described in greater detail hereinafter.

It will be clear from the foregoing that a reliable and informative log of a cased well can be obtained by the present invention which was not possible hitherto. In the past it was impossible to disposed one or more of the electrodes adjacent the well casing and directly in the earth strata, the characteristics of which were to be determined, but rather a trial and error technique of perforating the casing opposite a prospective, producing formation was followed. By the method which is obviously time consuming and laborious, a producing strata was sometimes located but no information could thus be obtained as to the geology of the area. We are aware that by gamma and neutron radiation logging some information can be obtained about the formations adjacent a cased well. However, this system has certain obvious disadvantages in comparison with our invention, for example, (a) from gamma radiation logs one cannot distinguish between sand and shale, and (b) the results are affected by contamination due to extraneous or non-indigenous radioactive particles in the mud or cement behind the casing, which contamination was placed there during the drilling or cementing operation. The present invention enables one to make a log which is more reliable and more accurate than previously obtainable, by driving at least one projectile electrode into the strata so that the electrical energy passed between the projectile electrode and the associated electrode is not substantially short-circuited through either the casing or the fluids adjacent the casing.

One form of the present invention is illustrated in the accompanying drawing which forms a part of this specification.

Figures 1, 2:
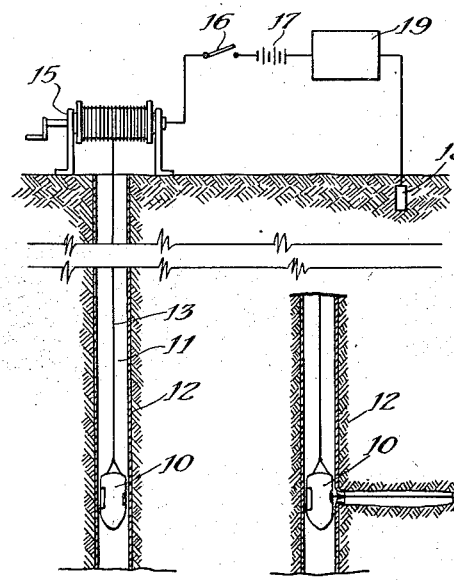
Figure 1 shows diagrammatically a device according to the present invention after it has been lowered into a well together with an electrical circuit for obtaining a log of a well.
Figure 2 shows the device after the projectile electrode has been driven into the surrounding earth strata.

With reference to Figures 1 and 2, a gun 10 has been lowered into a well 11 provided with a casing 12. A line 13 or the like may be used for lowering or raising the gun 10 in the well. An insulated electrical conductor 14 (shown in Figures 3 and 5) extends from the gun 10 up the well 11 to the windlass or other hoisting device 15. Electrical connection between conductor 14 and switch 16 is maintained by any well known means such as a brush and slip-ring combination or the like. A source of electrical energy 17 is disposed in the electrical circuit and is connected to switch 16. An associated electrode 18 which may be disposed in the ground as shown in the drawing is electrically connected to the source of electrical energy 17 through apparatus diagrammatically indicated by 19 of any well known type which can be used for receiving electrical energy and for producing a visual indication of any desired electrical characteristic of the current passing through the circuit.

As shown in Figure 2 the projectile electrode 20 may be driven from the gun 10 through the well casing 12 and into the surrounding earth strata, this action being initiated by closure of switch 16.

Figure 3:
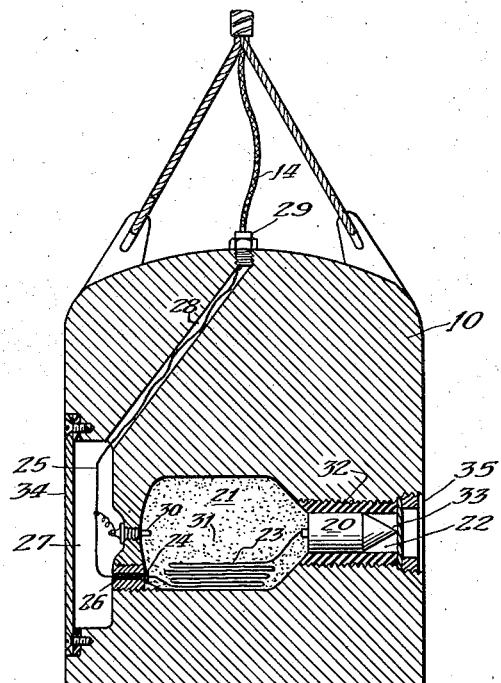
Figure 3 is a vertical cross-sectional view of one form of the device for driving a projectile electrode through a well casing and into the strata.

The device shown in Figure 3 consists of a gun 10 provided with a powder chamber 21 communicating with a bore 22. A projectile electrode 20 is disposed within the bore 22 and is electrically connected to an insulated conducting cable 23. The other end of cable 23 is secured to connector 24. An insulated line 25 passes from connector 24 through bushing 26 into recess 27 and thence through conduit 28 to connector 29 where it is electrically connected to insulated conductor 14. Means such as a fuse wire 30 is provided to set off the powder charge 31 disposed in chamber 21. In order to prevent electrical connection between the projectile electrode 20 and the body of gun 10 an insulating sleeve 32 lines the bore 22. Since the well being logged is very likely to be flooded with water and the gun 10 would be grounded through the water and well casing, it is desirable to provide a thin, frangible insulating diaphragm 33 over the opening of bore 22 to prevent electrical connection between the projectile electrode 20 and the water in the well. In the event that the explosive charge 31 is electrically conductive it is highly advisable to provide the butt end of the projectile electrode 20 with an insulating film, such as an insulating paint or the like, or otherwise the electrical system may be short circuited from the electrode 20 through the powder charge 31 to the gun 10 before the fuse wire 30, or the like, can ignite the charge.

When the powder charge 31 is set off by closing switch 16, the electrode 20 is propelled from the barrel 22, breaking the frangible diaphragm 33 and passing through the well casing 12 into the earth strata, drawing along behind it the cable 23 so that the electrode 20 will be located at a substantial distance from the well and in electrical communication with the indicating device 19 as shown in Figure 1. Thus as stated hereinbefore the electrode 20 is electrically connected through cable 23, connector 24, line 25, and cable 14, switch 16 to indicating device 19.

It will be clear that the present invention may also be used in uncased wells to great advantage since the electrode 20 will penetrate the earth strata beyond that section adjacent the well which will be contaminated by well fluids.

After the electrode has been fired into the earth stratum an electric current is passed to the electrode by means of battery 17 or other source of electrical energy and electric energy will flow out through the earth strata. Obviously either alternating or direct current may be used for this purpose. The electric energy will be picked up by associated electrode 18 and passed to apparatus 19 which may be simply a milliammeter, recording or indicating. It may be advantageous to use the casing itself as the second or associated electrode in place of electrode 18, in which case the electrical quantities mentioned will be associated only with the small volume in the vicinity of the projectile electrode 20 and be more indicative of the stratum in which the electrode is imbedded.

A removable plate 34 is placed over recess 27 so that the electrical connections therein and the fuse wire 30 may be repaired or replaced. The frangible diaphragm 33 is retained in place by ring 35.

Figure 5:
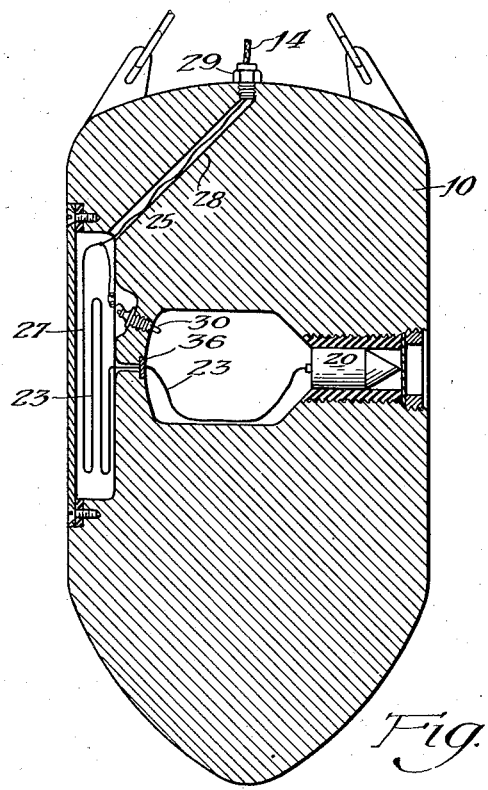
Figure 5 is a vertical cross-section of a modification of the device shown in Figure 3.
Figure 4:
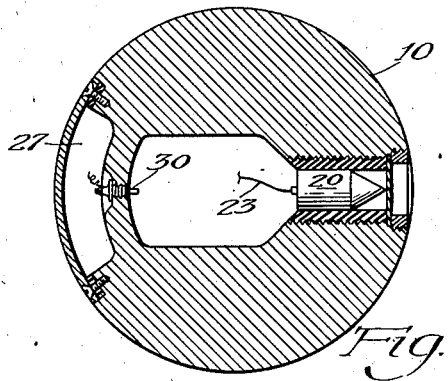
Figure 4 is a horizontal section of the device shown in Figure 3.

According to Figure 5 the insulated cable 23 connecting the electrode 20 with line 25 may be disposed in the recess 27 instead of in the powder chamber 21 as shown in Figure 3. In this case enough of the cable 23 is left in the powder chamber 21 to permit the electrode 20 to leave the gun before pulling out the cable disposed in recess 27. A sealing disc 36 is secured to the cable 23 to prevent the pressure from backing into the recess 27 when the explosive charge is set off.

The cable 23 must be electrically insulated to prevent a short circuit with the well casing 12 after the electrode has been fired into the earth strata and it must also be sufficiently protected in order to prevent injury or harm to said cable when the explosive charge 31 is set off. A suitable insulation and protective coating may consist of spun glass and fabric with an outer coating of very fine steel wire wound about said insulated cable. Such a cable combines strength with flexibility and gives the desired electrical insulation as well as sufficient protection against explosive charge. Preferably the conducting cable 23 should be of strong steel or copper alloy wire so that its connection with electrode 20 will not be severed when the electrode is fired into the earth strata.

As shown in Figures 3 and 5, when the switch 16 is closed, the powder charge 31 will be set off and the electrode 20 will break the diaphragm 33 and then pass through the casing 12 into the surrounding earth strata. As soon as the electrode 20 is lodged in the earth a circuit will be established between it and associated electrode 18 and a reading or recording on apparatus 19 can be obtained immediately.

After the desired information has been obtained the gun 10 may be withdrawn from the well 11 by means of line 13 and windlass 15. It is not particularly necessary to recover the electrode 20 and no special provisions have been made for such recovery.

It will be obvious that various modifications of this invention will occur to those skilled in the art and that the particular apparatus shown in the drawing is not the only arrangement which may be used for obtaining the desired results. For example, the well casing 12 may be punctured by a mechanical device following which an electrode may be driven through the opening and into the earth strata. Also if desired the electrode 20 may be driven mechanically, as for instance by a high tension spring, instead of by an explosive charge.

Also it will be clearly understood that several of the guns 10 may be lowered simultaneously into a well, so that several regions may be investigated without the necessity of withdrawing the gun each time to replace the electrode. Obviously the electrical system may be revised to permit the firing of each gun when desired as well as to permit separate readings or recordings on apparatus 19. Also, electrical measurements can be made between each of two or more projectile electrodes 20 simultaneously lodged in the earth strata adjoining the borehole. Also, measurements of self-potential as well as resistivity, etc., can be made by this apparatus. If desired, the potentials naturally occurring in a well may be recorded by apparatus 19, in which case provision must be made for cutting the source of electrical energy 17 out of the circuit after the explosive charge has been set off.

Having described our invention and the manner of practicing the same, what we claim is:

1. An electrode device for use as one or more of the electrodes of an electrical well logging system, said device comprising a gun provided with a bore, a projectile electrode disposed within said bore, means for driving said electrode from the bore, and electrically conductive means insulated from said gun for maintaining electrical connection with said electrode after the electrode has been driven from the bore.

2. A device for use in logging wells electrically comprising a gun provided with a bore and a chamber communicating therewith, an insulating sleeve within the bore, a frangible insulating diaphragm covering the bore opening, a projectile electrode disposed within the sleeve, an explosive charge disposed within said chamber, means for igniting said charge to drive the projectile electrode from the sleeve, and an electrically insulated conducting cable connected electrically to said projectile electrode, said cable being insulated from said gun and loosely disposed therewithin so as to maintan an electrical connection with said electrode after said electrode is driven from the sleeve.

3. A method for logging cased wells electrically comprising lowering a projectile electrode into a well, propelling said projectile electrode through said casing and into the earth strata surrounding said well, establishing an electric series path including an earth portion between the projectile electrode and a remote point and a return portion wholly insulated from the earth portion except at said electrode and said point, and measuring at least one electrical value determined by an electrical characteristic of the earth portion of said series path whereby information as to the nature of the earth near the projectile electrode may be obtained.

ROBERT W. STUART.
DANIEL SILVERMAN.